(12) United States Patent
Ouden

(10) Patent No.: US 7,536,341 B2
(45) Date of Patent: May 19, 2009

(54) METHOD AND SYSTEM FOR REGULATING THE PRODUCTION OF A SECOND FORM OF ENERGY, GENERATED FROM A FIRST FORM OF ENERGY

(75) Inventor: Barend Den Ouden, Bennekom (NL)

(73) Assignee: Amsterdam Power Exchange Spotmark B.V., Amsterdam (NL)

( * ) Notice: Subject to any disclaimer, the term of this patent is extended or adjusted under 35 U.S.C. 154(b) by 350 days.

(21) Appl. No.: 10/920,611

(22) Filed: Aug. 18, 2004

(65) Prior Publication Data

US 2005/0050893 A1 Mar. 10, 2005

Related U.S. Application Data

(63) Continuation of application No. PCT/NL03/00856, filed on Dec. 4, 2003.

(30) Foreign Application Priority Data

Apr. 4, 2003 (NL) .................................... 1023105

(51) Int. Cl.
 *G06Q 40/00* (2006.01)
 *G06F 17/00* (2006.01)
(52) U.S. Cl. ......................................... 705/37; 704/400
(58) Field of Classification Search .................. 705/1, 705/7–11, 26, 27, 29, 37, 400, 412; 700/286, 700/287, 291, 295, 296; 60/645, 652, 660, 60/664, 670, 676; 703/2, 4, 5, 12–22
See application file for complete search history.

(56) References Cited

U.S. PATENT DOCUMENTS 4,745,758 A * 5/1988 Putman et al. ................. 60/676

(Continued)

FOREIGN PATENT DOCUMENTS

EP 0 893 755 A2 1/1999

(Continued)

OTHER PUBLICATIONS

U.S. Appl. No. 10/777,446, filed Feb. 12, 2004, Ouden.

(Continued)

*Primary Examiner*—Igor N Borissov
(74) *Attorney, Agent, or Firm*—Steven M. Koehler; Westman, Champlin & Kelly, P.A.

(57) ABSTRACT

The invention relates to a method for regulating the production and/or delivery of a second energy form generated from a first energy form in a system comprising production units for converting said first energy form into said second energy form and delivering said second energy form, and a market server being communicatively connected to one or more supplier units of suppliers of the second energy form. In one embodiment, the method comprises the steps of receiving one or more data strings with production data from the supplier units by, on or via the market server, which data strings comprise at least two production parameters from the set comprising the demand volume of the first energy form, the supply volume of the second energy form and the conversion efficiency of the conversion of the first energy form into the second energy form; determining on or via the market server, on the basis of the data received, a value for a conversion volume parameter of the production of the second energy form from the first energy form; determining on or via the market server, on the basis of the value of said conversion volume parameter, a volume of the first energy form that is to be converted and a volume of the second energy form that is to be produced; and making accessible on or via the market server data relating to the volume of the first energy form that is to be converted and the volume of the second energy form that is to be produced. The production units that produce and/or deliver the second energy form have been selected by the market server.

17 Claims, 3 Drawing Sheets

U.S. PATENT DOCUMENTS

| | | | |
|---|---|---|---|
| 5,237,507 A | 8/1993 | Chasek | 324/464.04 |
| 5,317,566 A | 5/1994 | Joshi | |
| 5,794,212 A | 8/1998 | Mistr, Jr. | 705/26 |
| 5,873,251 A * | 2/1999 | Iino | 60/660 |
| 6,421,770 B1 | 7/2002 | Huch et al. | 711/209 |
| 6,473,744 B1 | 10/2002 | Tuck et al. | |
| 6,631,134 B1 | 10/2003 | Zadikian et al. | 370/395.21 |
| 6,735,553 B1 | 5/2004 | Frogner et al. | 702/186 |
| 7,299,212 B2 | 11/2007 | Peljto | 705/412 |
| 2002/0023044 A1 * | 2/2002 | Cichanowicz | 705/37 |
| 2002/0071395 A1 | 6/2002 | Redi | |
| 2002/0165816 A1 | 11/2002 | Barz | 705/37 |
| 2002/0184138 A1 | 12/2002 | Adamson | 705/37 |
| 2003/0009265 A1 * | 1/2003 | Edwin | 700/295 |
| 2003/0055776 A1 | 3/2003 | Samuelson | 705/37 |
| 2003/0182250 A1 | 9/2003 | Shihidehpour et al. | 706/21 |
| 2003/0225661 A1 | 12/2003 | Peljto | |
| 2004/0010478 A1 | 1/2004 | Peljto et al. | 705/412 |
| 2004/0044442 A1 * | 3/2004 | Bayoumi et al. | 700/286 |
| 2005/0278262 A1 | 12/2005 | Cheliotis et al. | 705/400 |
| 2006/0025972 A1 * | 2/2006 | Johnson et al. | 703/2 |
| 2006/0085285 A1 * | 4/2006 | Cichanowicz | 705/26 |

FOREIGN PATENT DOCUMENTS

| | | |
|---|---|---|
| WO | WO2004/023368 A3 | 3/2004 |

OTHER PUBLICATIONS

Yu Z, et al., Optimal and reliable dispatch of supply and demand bids for competitive electricity markets, Power Engineering Society Summer Meeting, 2000. IEEE Jul. 16-20, 2000, Piscataway, NJ, USA, IEEE, vol. 4, Jul. 16, 2000, pp. 2138-2143.

Ranatunga Rask et al., Case Study of Network Characteristics Based Optimal Pricing and Dispatch, 1999 IEEE Transmission and Distribution Conference. New Orleans, LA, Apr. 11-16, 1999, IEEE Transmission and Distribution Conference, New York, NY, vol. 1, Apr. 11, 1999, pp. 190-196.

Office Action for U.S. Appl. No. 10/777,446, PTO mail date Apr. 4, 2008.

Restriction Requirement for U.S. Appl. No. 10/777,446, PTO mail date Jan. 10, 2008.

Office Action for U.S. Appl. No. 10/777,446, PTO mail date Sep. 5, 2007.

Final Office Action for U.S. Appl. No. 10/777,446, PTO mail date Apr. 30, 2007.

Office Action for U.S. Appl. No. 10/777,446, PTO mail date Oct. 18, 2006.

Office Action for U.S. Appl. No. 10/936,454, PTO mail date Apr. 10, 2008.

* cited by examiner

METHOD AND SYSTEM FOR REGULATING THE PRODUCTION OF A SECOND FORM OF ENERGY, GENERATED FROM A FIRST FORM OF ENERGY

CROSS-REFERENCE TO RELATED APPLICATION

The present application is a continuation of and claims priority of International patent application Serial No. PCT/NL03/00856, filed Dec. 4, 2003, and published in English the content of which is hereby incorporated by reference in its entirety.

BACKGROUND OF THE INVENTION

The invention relates to a method for regulating the production of a second energy form generated from a first energy form via a market server being communicatively connected to one or more supplier units of suppliers of said second energy form.

The production of a particular energy form often takes place by generating said energy form from another energy form. In such a case the generation of e.g. a high-grade form of energy from a lower-grade form of energy may be concerned. An example of this is a gas-fired power plant, in which gas as the first energy form is converted into electricity as the second energy form. Such a conversion invariably involves a loss of energy in practice. The smaller the extent of said loss, the higher the conversion efficiency.

EP 0 893 775 discloses a process and a system for management of electric energy production. A process and a system are concerned wherein probability distributions for electric energy spot market prices are generated on the basis of price functions, among other things, generated on the basis of assumptions or indirectly obtained data, and the transmission capacity of the network connections.

A problem of the prior art is the fact that the method and the system for regulating the production of electric energy is time-consuming and laborious. The server, which forms part of the system and which carries out the method, must generate probability distributions, which requires server capacity and which has a negative effect on the server speed. Furthermore, the resulting spot market price is uncertain.

SUMMARY OF THE INVENTION

It is an object of the invention to provide a method for regulating the production of the second energy form.

This object is achieved as one aspect of the present invention as a method for regulating the production of a second energy form generated from a first energy form from one or more supplier units of suppliers of said second energy form, the method comprising:

receiving production data from each of the supplier units, which production data comprises at least two production parameters from the set comprising the demand volume of the first energy form, the supply volume ($V_{A,e}$; $V_{B,e}$; $V_{C,e}$) of the second energy form and the conversion efficiency ($\eta_A$; $\eta_B$; $\eta_C$) of the conversion of the first energy form into the second energy form;

determining a volume ($V_{ge}$; $V_g$) of the first energy form that is to be converted and a volume ($V_e$) of the second energy form that is to be produced from the production data received;

making accessible data relating to the volume ($V_{ge}$) of the first energy form that is to be converted and the volume ($V_e$) of the second energy form that is to be produced.

This object is also achieved by the provision of a method which comprises the following steps which can be carried out by, on or via the market server:

receiving one or more data strings with production data from the supplier units, which data strings comprise at least two production parameters from the set comprising the volume of the first energy form being demanded, the supply volume of the second energy form and the conversion efficiency of the conversion of the first energy form into the second energy form;

determining, on the basis of the production data received, a value for a conversion volume parameter of the production of the second energy form from the first energy form;

determining, on the basis of the value of said conversion volume parameter, a volume of the first energy form that is to be converted and a volume of the second energy form that is to be produced;

making accessible data relating to the volume of the first energy form that is to be converted and the volume of the second energy form that is to be produced.

Because the market server receives direct production data from the producers, the server can efficiently translate these data into an actual volume of the second energy form to be produced by the supplier without making use of probability distributions. This enables the market server to provide information about the volume of the first energy form to be converted and the volume of the second energy form to be produced more quickly and more efficiently.

The market server, which in fact runs at least a combination of a gas market and an electricity market, enables the suppliers of electricity on said combination market, by inputting their production data into the market server, to actually supply electricity independently of the absolute prices on the gas market and the electricity market, only when the difference in price between the two markets is sufficiently large. In this way a technical problem is solved, viz. the fact that it is impossible to store electricity. For energy producers, such as gas-fired power plants, the storage of gas is not practically feasible, either, considering the very specific infrastructure that is required in such a case. Storage of the two energy forms is thus prevented in that the market server on which the method according to the invention is implemented guarantees that gas will only be purchased and/or electricity will only be produced if said electricity can profitably be sold.

In a preferred embodiment of the invention, the market server determines or receives data on the variation of an isolated equilibrium price for the first energy form and adjusts this variation on the basis of the conversion efficiency of the conversion of the first energy form into the second energy form. This achieves that first suppliers having the highest conversion efficiency are given a chance to produce and deliver the second energy form.

In a preferred embodiment of the invention, the first energy form is a low-grade energy form, e.g. gas, and the second energy form is a high-grade energy form, e.g. electricity. In this embodiment, the suppliers of the electricity may e.g. be gas-fired power plants or traders.

In a preferred embodiment of the invention, at least a unit of the first energy form is converted into a unit of the second energy form by or via the market server. Said unit is preferably related to the unit of volume of the first energy form that is to be converted. The advantage of such a conversion on the market server or in the supplier units is that the method according to the invention enables easy comparison of the magnitudes, parameters and/or variables of the first energy form and the second energy form, which is conducive towards a quick and efficient operation of the market server.

In a preferred embodiment of the invention, the data strings comprise production data per unit time. Such a unit time is e.g. one hour or a block of hours.

The invention further relates to a method for regulating the production and/or delivery of a second energy form generated from a first energy form in a system comprising production units for converting said first energy form into said second energy form and delivering said second energy form, and a market server being communicatively connected to one or more supplier units of suppliers of the second energy form, which method comprises the steps of:

receiving one or more data strings with production data from the supplier units by the market server, which data strings comprise at least two production parameters from the set comprising the demand volume of the first energy form, the supply volume of the second energy form and the conversion efficiency of the conversion of the first energy form into the second energy form;

determining on or via the market server, on the basis of the data received, a value for a conversion volume parameter of the production of the second energy form from the first energy form;

determining on or via the market server, on the basis of the value of said conversion volume parameter, a volume of the first energy form that is to be converted and a volume of the second energy form that is to be produced;

producing and/or delivering the second energy form by the production units, which production units have been selected by the market server.

The technical effect of this method is that the production units of the second energy form are selected in such a manner via the market server that the second energy form will at all times be supplied by the production units that have the highest conversion efficiency. This is effected by the processing steps carried out by the market server on the data strings comprising production data of the suppliers. The production units are e.g. selected on the basis of the data relating to the volume of the first energy form that is to be converted and the volume of the second energy form that is to be produced, i.e. the conversion efficiency. As a result of this selection, power plants having a low conversion efficiency will be used as little as possible, which is advantageous, e.g. for environmental reasons.

The invention also relates to a computer programmed embodied on computer readable media operable on a computer for regulating the production of a second energy form generated from a first energy form, which programmed comprises portions for carrying out the methods as described above.

Finally, the invention relates to a system for regulating the production of a second energy form generated from a first energy form, which system comprises a market server and one or more supplier units being communicatively connected to said market server, wherein, in one embodiment, the market server is arranged for:

receiving one or more data strings with production data from the supplier units, which data strings comprise at least two production parameters from the set comprising the demand volume of the first energy form, the supply volume of the second energy form, and the conversion efficiency of the conversion of the first energy form into the second energy form;

determining, on the basis of the data received, a value for a conversion volume parameter of the production of the second energy form from the first energy form;

determining, on the basis of the value of said conversion volume parameter, a volume of the first energy form that is to be converted and a volume of the second energy form that is to be produced, making accessible on or via the market server data relating to the volume of the first energy form that is to be converted and the volume of the second energy form that is to be produced.

In this system the market server receives data strings comprising direct production data from the supplier units of the suppliers of the second energy form, which leads to an efficient operation of the system. The system furthermore offers suppliers of the second energy form a solution to storage problems of the first and/or the second energy form.

The applicant's non-prepublished Dutch patent application NL 1021394 ("A method and a computer programme for regulating the energy flow in an energy network, as well as a system for electronically auctioning energy") describes an auctioning system and a method for regulating an electronically auctioning energy in a network having a limited transmission capacity. No mention is made in said application of the conversion of a first energy form into a second energy form, however, and consequently the subject of conversion efficiency is not discussed, either.

BRIEF DESCRIPTION OF THE DRAWINGS

Hereinafter an embodiment of the invention will be described in more detail by way of example, in which description reference is made to the accompanying Figures, in which.

DETAILED DESCRIPTION OF THE ILLUSTRATIVE EMBODIMENT

Figure 1:
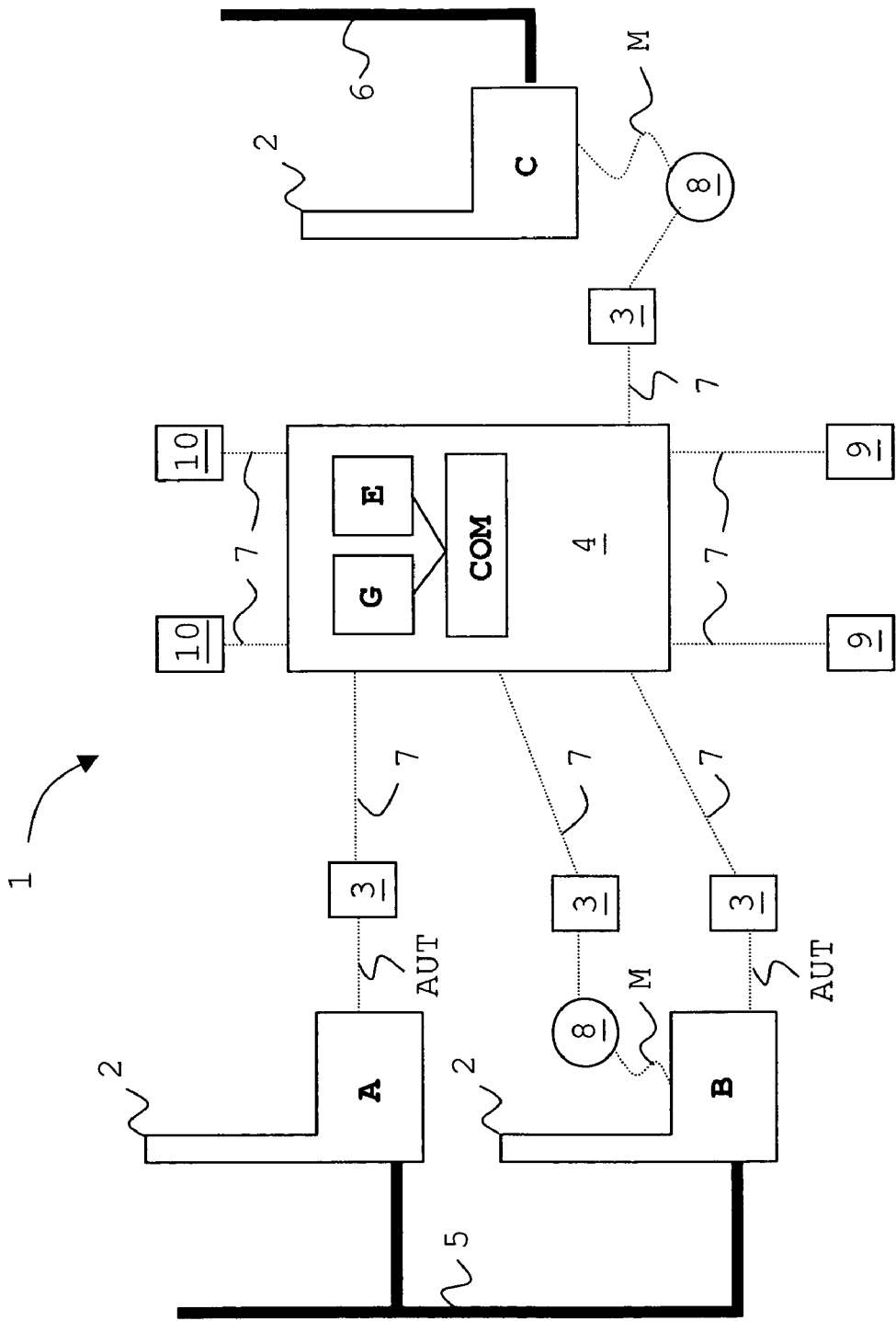
FIG. 1 shows an embodiment of a system comprising production units of a second energy form.

In FIG. 1 a system 1 is shown which comprises production units 2, respectively indicated A, B and C, supplier units 3 and a market server 4. The production units 2 are e.g. gas-fired power plants, hereinafter called power plants, with the power plants A and B producing energy and delivering it over the electricity network 5, whilst the power plant C produces electricity and delivers it over the electricity network 6. The market server 4 is communicatively connected to the supplier units 3 via connections 7, which connections 7 may be wire connections or wireless connections. The connections 7 are e.g. Internet connections. The supplier units 3 belong to the operators of the power plants 2 or to traders 8. The supplier units 3 may be in direct contact with the power plants 2 or via a trader 8. Furthermore, the market server 4 may be directly or indirectly connected to user units 9 and 10 of parties making demand bids and/or supply bids for the first and/or the second energy form. In this way the server 4 can function as a market server for the individual markets for gas (G) and electricity (E). It is noted that said individual markets for gas (G) and electricity (E) are not necessarily maintained on the market server 4. In principle, the market server only needs to run a combination market (COM) of gas and electricity.

Power plant A is e.g. a 100 MW, gas-fired power plant, 90% of whose capacity is sold on the basis of bilateral contracts. Power plant A wants to produce the full 100%, however, and sell the remaining 10% on the spot market. It stands to reason that this will only be attractive, however, if the cost of the conversion of the gas into electricity is equal to or less than the proceeds of the sale of electricity on the spot market.

The efficiency η of the conversion of the gas into electricity is an important factor in determining the cost. Said efficiency depends on several factors, such as the age of the power plant 2, the cooling water inlet temperature, etc. The efficiency varies with time, and consequently it is represented as η(t). In practice, the figures as regards the efficiency η(t) of the conversion of the first energy form into the second energy form are precisely known for every power plant 2a. For the hour t=h, for example, the efficiency η(h)=0.5 for the power plant A.

Now an embodiment of the method according to the invention will be described in more detail with reference to FIGS. 2-5. It is assumed in this connection that the market server 4 runs both the combination market (COM) and the isolated gas (G) and electricity (E) markets.

Figure 2:
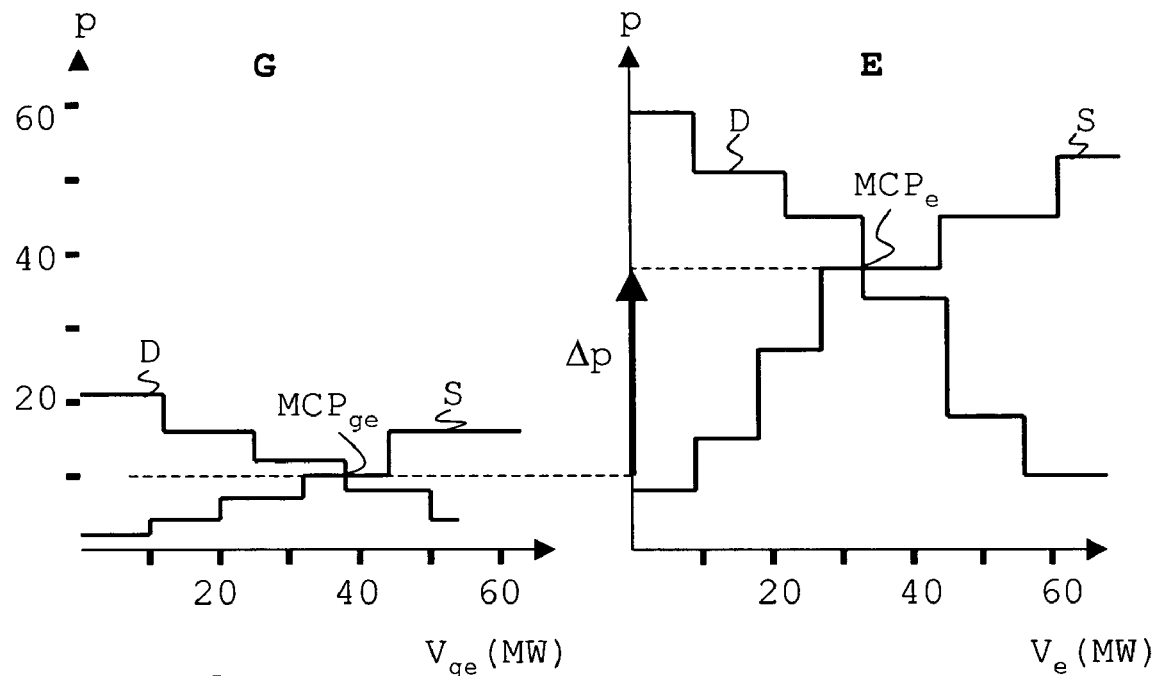
FIG. 2 shows a first step of an embodiment of the method according to the invention.

FIG. 2 shows the demand curve D and the supply curve cover S for isolated gas G (on the left) and electricity E (on the right) markets. The demand D and supply S curves arise from bids made on the market server 4 from the user units 9, 10. Bids for the isolated markets can also be made from the supplier units 3. The equilibrium prices or market clearing prices for gas and electricity are indicated as $MCP_{ge}$ and $MCP_e$ for the isolated markets G and E. The two markets G and E function separately from each other and, as already said before, they can run on the market server 4. For the linking of the markets and the efficient operation of the server 4, the volumes and the prices at the gas auction market G are expressed in electricity equivalents, i.e. in MW and /MW. For this conversion, a conversion factor F may be used for the conversion from a cubic meter of gas to the unit MWh for electricity. In the case of natural gas, F=113.6 m3/MWh.

At t=h, the cost of producing 1 MWh of electricity for the producer is:

$$PA_{,ge}(h)=F/\eta A(h)*MCP_g(h)=MCP_{ge}(h)/\eta A(h)$$

If said cost is lower than the equilibrium price, $MCP_e(h)$ on the electricity auction market E ($P_{ge}(h)$ $MCP_e(h)$), it will be useful for the producer A to purchase an amount of gas equivalents on the gas auction market G and subsequently sell said volume on the electricity auction market E. Said volume to be converted and produced follows from:

$$V_{ge}(h)=Ve\ (h)/\eta(h)\ and\ V_g(h)=F*V_{ge}(h)$$

wherein $V_e(h)$=10 MW in the example.

If producer A is not interested in supply and demand per hour, he can opt for supplying electricity during a block of an uninterrupted number of hours, for example. The server 4 can work with average values in such a case, so that buying gas via the supplier unit 3 on the gas auction market G and selling electricity on the electricity auction market A is financially wise for A when $P_{ge,\ average}$ $MCP_{e,average}$.

Hereinafter, a situation of supply and demand per hour is taken as the starting point.

A can input orders on the combined market COM by transmitting one or more data strings comprising production data from the supplier units 3 to the market server 4 via the connections 7. Said production data e.g. comprise the electricity volume $V_{A,e}(h)$ that A wishes to supply (the volume bid for sale) and the conversion efficiency η(h) of A's power plant 2. The server 4 subsequently places an order derived from this order on the gas market G as an order at best. On the gas market G this derived order comprises the hour in question and the gas volume $V_g(h)$, the unit of which is converted by the server 4 to $V_{ge}(h)$ by using the conversion factor F. On the electricity market E, an order at best comprising the hour in question and the electricity volume $V_e(h)$ is placed by the server 4.

Figure 3:
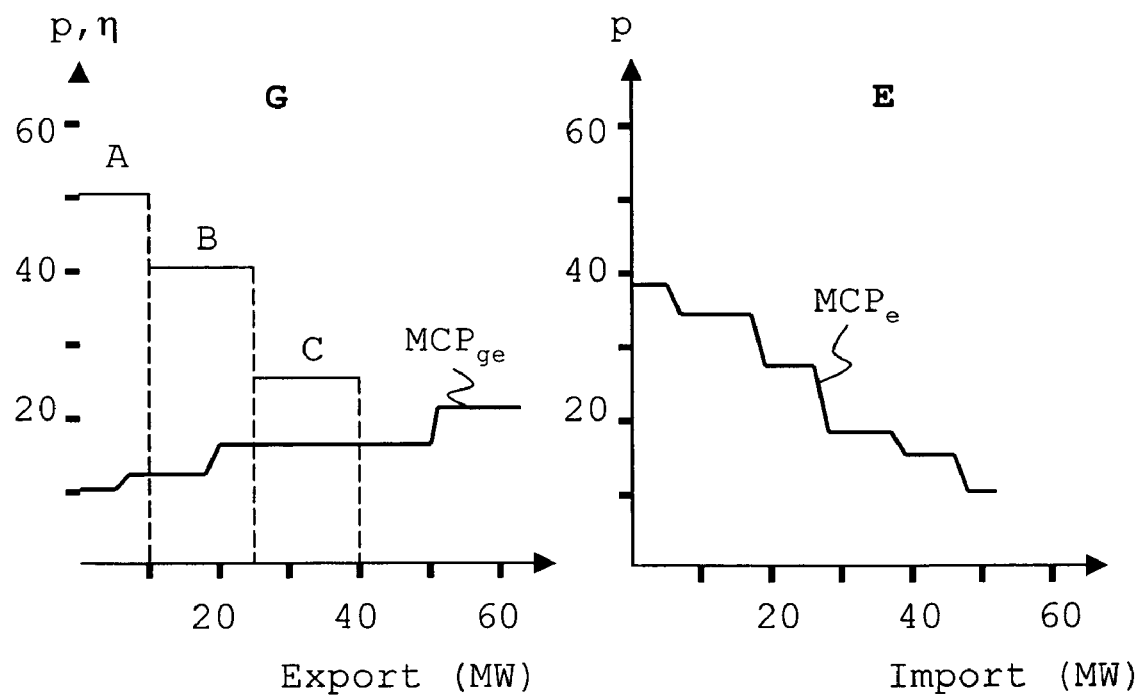
FIG. 3 shows a second step of an embodiment of the method according to the invention.

FIG. 3 shows the influence that the orders at best being input on the market server 4 have both on the equilibrium price $MCP_{ge}(h)$ for the gas market G and on the equilibrium price $MCP_e(h)$ for the electricity market E. Since the intention is to convert gas into electricity, in fact export of gas and import of electricity takes place, which leads to an equilibrium price $MCP_{ge}(h)$ increase on the gas market G and an equilibrium price $MCP_e(h)$ decrease on the electricity market E, respectively. The curves in FIG. 3 show the result of a simulated conversion of gas into electricity (in fact gas is withdrawn from the gas market G) and the subsequent supply of electricity on the electricity market E. FIG. 3 furthermore shows the orders input by the power plants A, B and C (dotted lines). Power plant A makes a supply bid for 10 MW and has a conversion efficiency η(h)=50%; power plant B makes a supply bid for 15 MW and has a conversion efficiency η(h) =40%; power plant C likewise makes a supply bid for 15 MW and has a conversion efficiency η(h)=25%. These data are processed by the market server 4. It is noted that the conversion efficiency may also be a fictitious conversion efficiency, e.g. because the producer takes into account in his efficiency factor calculation the fact that further revenue can be generated from the losses that occur upon conversion. An example of this is a producer 2 who utilises the losses that occur upon conversion of gas into electricity for heating water for district heating purposes, which results in a higher fictitious efficiency.

Figure 4:
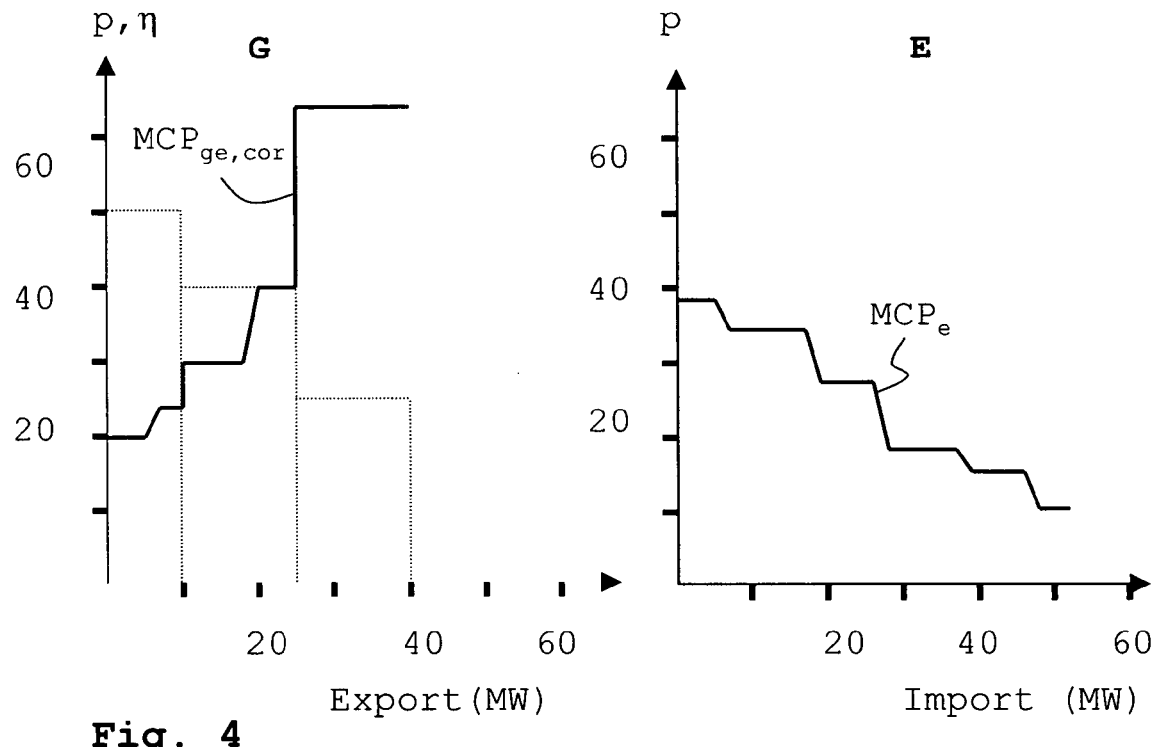
FIG. 4 shows a third step of an embodiment of the method according to the invention.

FIG. 4 shows the results of the incorporation of the production data on the combination market COM by the market server 4. The trend of the equilibrium price $MCP_{ge}(h)$ for the gas market G has been adjusted, represented as $MCP_{ge,cor}$, on the basis of the production data with regard to the conversion efficiency η(h) as received by the server. The incorporation of the conversion efficiency η(h) leads to the equilibrium price $MCP_{ge}(h)$ increasing as the conversion efficiency η(h) decreases. In this way the producers 2 having the highest conversion efficiency are the first that are given a chance to supply the electricity. Since the efficiency values η of the power plants 2 may vary over time, it is not of necessity the same power plants 2 that are selected each time.

Figure 5:
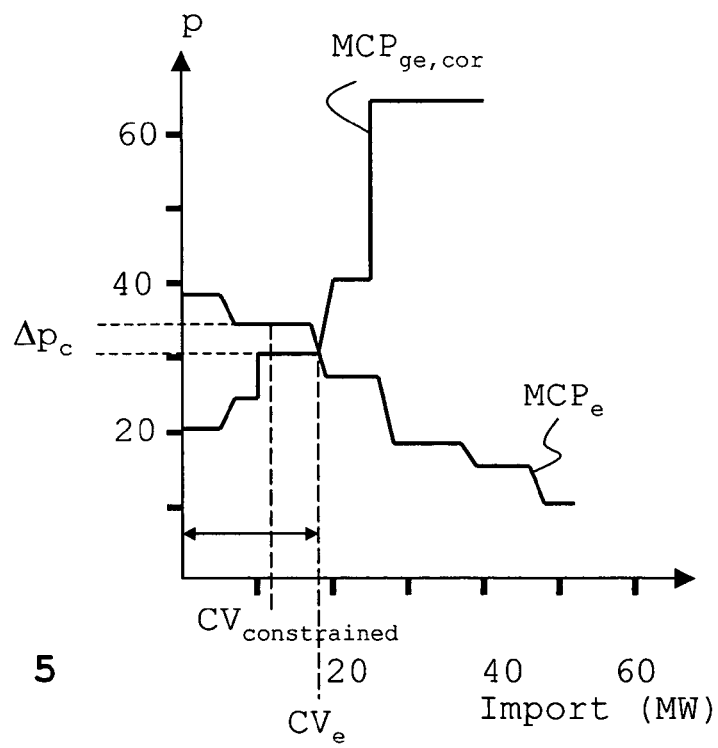
FIG. 5 shows a fourth step of an embodiment of the method according to the invention.

FIG. 5 subsequently shows the integrated representation of the gas market G and the electricity market E. The intersection of the curves determines the conversion volume parameter $CV_e$. In the example this means that the value of the conversion volume parameter is 18 MW for the hour h. This implies that producer A can produce the entire 10 MW, whilst producer B can produce 8 MW of the 15 MW for which a supply bid was made. Producer C is not given a chance to supply. According to the invention, this prevents the possible occurrence of a situation in which producer C has purchased gas for conversion into electricity or in which producer B produces too much electricity, which would be problematic because of the impossibility to store gas and electricity.

In practice this result is obtained in that two so-called "At Market" orders are generated on the market server 4. Said orders can be made accessible to the producers 2 on or via the market server 4 by placing the orders on the isolated gas market G and the isolated electricity market E, as a shown in FIG. 2. The order for the gas market G generated by the market server 4 comprises the hour in question and the volume $V_{ge}$ or $V_g$ of gas to be converted, depending on the units being used for the gas market G; the order for the electricity market E comprises the hour in question and the volume of electricity $V_e$ to be produced. These orders are directly related to each other. If either one of the two orders cannot be carried out, the other order will be cancelled as well. Subsequently a comparison is made on the market server 4 between the equilibrium price $MCP_{ge}(h)$ on the gas market G and equilibrium price $MCP_e(h)$ on the electricity market E. A difference in price may e.g. be caused by the presence of the block orders. In the case of $MCP_e(h) > MCP_{ge}(h)$, the steps as described above are carried out anew.

Finally, the matched orders are converted into contracts for supplying electricity. These contracts can be implemented either manually or automatically. This means that the actual conversion of gas into electricity and the subsequent supply of the electricity by the producers 2 as determined by the execution of the method as described above on the market server 4 can be effected either by means of a verbal order (indicated M in FIG. 1), e.g. on the basis of a legal obligation, or automatically (indicated AUT in FIG. 1).

In the situation as described above, it is assumed that sufficient conversion capacity is available for realising the value of the conversion volume parameter $CV_e$. If the available conversion capacity for converting gas into electricity is insufficient, or if the gas market G is not deep enough, i.e. the curve $MCP_{ge}$ does not continue until $CV_e$, the optimum value $CV_e$ will not be attainable. In such a case a limited value $CV_{constrained}$ for the conversion volume parameter will be realised, which involves a price difference $p_c$. This situation is handled by the market server 4 in the manner as described in non-prepublished Dutch patent application NL 1021394.

It stands to reason that the invention is not limited to the embodiment as described in the foregoing, but that it may be combined with the system as described in non-prepublished Dutch patent application NL 1021394 ("A method and a computer programme for regulating the energy flow in an energy network, as well as a system for electronically auctioning energy"), or described in U.S. patent application Ser. No. 10/777,446 filed Feb. 12, 2004, or international application PCT/NL03/00217 filed Mar. 21, 2003, all of which are hereby incorporated by reference in their entireties. Such an embodiment may e.g. be implemented in a situation in which a supplier of the second energy form is present in a first area and one or more purchasers of the second energy form are present in a second area, which areas are interconnected by an energy network having a limited transmission capacity. Suppliers of the second energy form may also be present in the second area. It will be apparent to those skilled in the art that extensions of such embodiments fall within the scope of the present application.

The invention claimed is:

1. A method for estimating, from one or more suppliers, a volume of a first energy form that is to be used to generate to a second energy form, and a volume of the second energy form that is to be produced, the method comprising:
providing a market server computer running a combined market of the first energy form and the second energy form and communicatively connected to said one or more suppliers;
determining equilibrium prices for the first energy form and the second energy form when a market for the first energy form is isolated from a market for the second energy form;
receiving by the market server computer one or more data strings with production data from each of the suppliers, which data strings comprise a conversion efficiency of conversion of the first energy form into the second energy form and at least one production parameter selected from a set comprising a demand volume of the first energy form and a supply volume of the second energy form;
conducting simulated generation of the second energy form from the first energy form when a market for the first energy form is combined with a market for the second energy form using the market server computer;
determining a first variation characteristic of equilibrium price for the first energy form using the simulated generation of the second energy form from the first energy form and using said production data;
determining a second variation characteristic of equilibrium price for the second energy form using the simulated generation of the second energy form from the first energy form;
comparing the first variation characteristics of equilibrium price for the first energy form and the second variation characteristic of equilibrium price for the second energy form;
determining by the market server computer a value for a conversion volume parameter of the production of the second energy form from the first energy form using the comparison of the first variation characteristic of equilibrium price for the first energy form and the second variation characteristic of equilibrium price for the second energy form;
determining by the market server computer, using the value of said conversion volume parameter, a volume of the first energy form that is to be converted and a volume of the second energy form that is to be produced; and
providing information related to said volume of the first energy form that is to be converted and said volume of the second energy form that is to be produced by the market server computer to said one or more suppliers.

2. The method according to claim 1, further comprising:
determining or receiving data by the market server computer on the variation of equilibrium price for the first energy form, adjusted on the basis of the conversion efficiency of the conversion of the first energy form into the second energy form; and
determining the value of the conversion volume parameter using the data on the variation of the equilibrium energy price for the first energy form.

3. The method according to claim 1, wherein the first energy form is a lower-grade energy form and the second energy form is a higher-grade energy form relative to the first energy form.

4. The method according to claim 1, wherein at least a unit of the first energy form is converted into a unit of the second energy form.

5. The method according to claim 4, wherein said converted unit is related to a unit of volume of the first energy form that is to be converted.

6. The method according to claim 1, wherein said data strings comprise production data per unit time.

7. The method according to claim 6, wherein said unit time is an hour.

8. The method according to claim 1, wherein the production parameters from said set relate to the supply volume of the second energy form and the conversion efficiency of the conversion of the first energy form into the second energy form.

9. The method according to claim 1, wherein suppliers are available for converting the first energy form into the second energy form and the method further comprises producing or delivering the second energy form by the suppliers, which suppliers have been selected by the market server computer.

10. The computer readable medium according to claim 9, and further comprising instructions to select the suppliers using the production data.

11. A computer readable medium having computer readable instructions embedded therein which, when executed by a computer, causing siad computer to implement a method for estimating, from one or more suppliers, a volume of a first energy form that is to be used to generate a second energy form, and a volume of the second energy form that is to be produced, comprising:
   running a combined market of the first energy form and the second energy form and communicating with said one or more suppliers;
   determining equilibrium prices for the first energy form and the second energy form when a market for the first energy form is isolated from a market for the second energy form;
   receiving one or more data strings with production data from each of the one or more suppliers, which data strings comprising a conversion efficiency of conversion of the first energy form into the second energy form and at least one production parameter selected from a set comprising a demand volume of the first energy form and a supply volume of the second energy form;
   conducting simulated generation of the second energy form from the first energy form using a computer;
   determining a first variation characteristic of equilibrium price for the first energy form using the simulated generation of the second energy form from the first energy form and using said production data;
   determining a second variation characteristic of equilibrium price for the second energy form using the simulated generation of the second energy form from the first energy form;
   comparing the first variation characteristics of equilibrium price for the first energy form and the second variation characteristic of equilibrium price for the second energy form;
   determining, a value for a conversion volume parameter of the production of the second energy form from the first energy form;
   determining, using said conversion volume parameter, a volume of the first energy form that is to be converted and a volume of the second energy form that is to be produced; and
   providing information related to said volume of the first energy form that is to be converted and said volume of the second energy form that is to be produced to said one or more suppliers.

12. The computer readable medium according to claim 11, and further comprising:
   determining or receiving data by the market server on the variation of an isolated equilibrium price for the first energy form, adjusted on the basis of the conversion efficiency of the conversion of the first energy form into the second energy form; and
   determining the value of the conversion volume parameter using the data on the variation of the isolated energy price for the first energy form.

13. The computer readable medium according to claim 11, wherein said data strings comprise production data per unit of time.

14. The computer readable medium according to claim 11, wherein the production parameters from said set relate to the supply volume of the second energy form and the conversion efficiency of the conversion of the first energy form into the second energy form.

15. A system for estimating, from one or more suppliers, a volume of a first energy form that is to be used to generate to a second energy form, and a volume of the second energy form that is to be produced, comprising:
   a memory; and
   a market server computer;
   wherein the market server comnuter is configured to:
      determining equilibrium prices for the first energy form and the second energy form when a market for the first energy form is isolated from a market for the second energy form;
      receive one or more data strings with production data from one or more suppliers that can generate the second energy form from the first energy form, which data strings comprise a conversion efficiency of conversion of the first energy form into the second energy form and at least one production parameter selected from a set comprising a demand volume of the first energy form and a supply volume of the second energy form;
      conduct simulated generation of the second energy form from the first energy form using a computer;
      determine a first variation characteristic of equilibrium price for the first energy form using the the simulated generation of the second energy form from the first energy form and using said production data;
      determine a second variation characteristic of equilibrium price for the second energy form using the simulated generation of the second energy form from the first energy form;
   comparing the first variation characteristics of equilibrium price for the first energy form and the second variation characteristic of equilibrium price for the second energy form;
      determine a value for a conversion volume parameter of the production of the second energy form from the first energy form;
      determining, using the value of said conversion volume parameter, a volume of the first energy form that is to be converted and a volume of the second energy form that is to be produced; and
      output information related to said volume of the first energy form that is to be converted and said volume of the second energy form that is to be produced by the market server computer to said one or more suppliers.

16. The system according to claim 15, wherein the first energy form is a lower-grade energy form and the second energy form is a higher-grade energy form than the first energy form.

17. The system according to claim 16 and further comprising one or more suppliers for converting the first energy form into the second energy form, wherein each of the one or more suppliers is arranged to communicate with the market server and the market server is configured to communicate with each of the one or more suppliers.

* * * * *